United States Patent [19]

Coker

[11] Patent Number: 4,721,140

[45] Date of Patent: Jan. 26, 1988

[54] COVER DEVICE FOR PREVENTING SPATTERS DURING THE HEATING OF FOOD

[75] Inventor: Stanley W. Coker, Aurora, Colo.

[73] Assignee: Timothy J. Martin, Lakewood, Colo.

[21] Appl. No.: 18,505

[22] Filed: Feb. 25, 1987

[51] Int. Cl.⁴ .................................... B65D 65/02
[52] U.S. Cl. .................... 150/52 R; 219/10.55 E; 99/DIG. 14
[58] Field of Search ............... 150/52 R; 219/10.55 E; 99/DIG. 14

[56] References Cited

U.S. PATENT DOCUMENTS

| | | | |
|---|---|---|---|
| 3,246,446 | 4/1966 | Powers | 150/52 R |
| 3,960,193 | 6/1976 | Davis | 150/52 R |
| 4,291,775 | 9/1981 | Collins | 219/10.55 E |

*Primary Examiner*—William Price
*Attorney, Agent, or Firm*—Timothy J. Martin

[57] ABSTRACT

A screen device is adapted to cover a container or plate of food during heating, especially in microwave ovens. The screen device is formed as a sheet of open weave material, preferably polyester, and a plurality of plastic weight elements are secured to the peripheral margin of the sheet.

12 Claims, 8 Drawing Figures

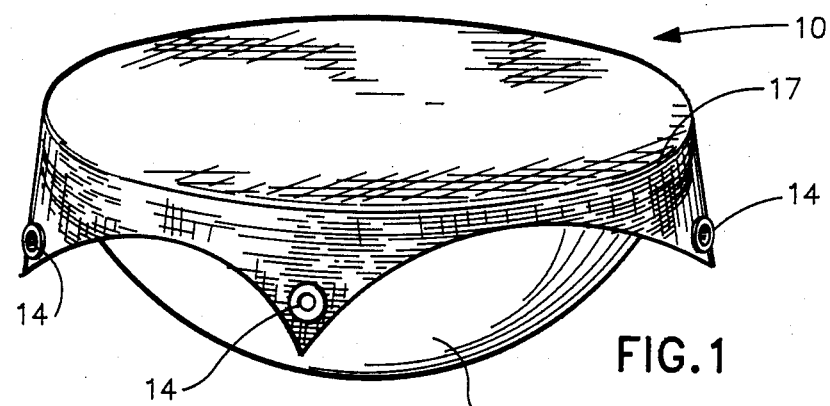
FIG. 1
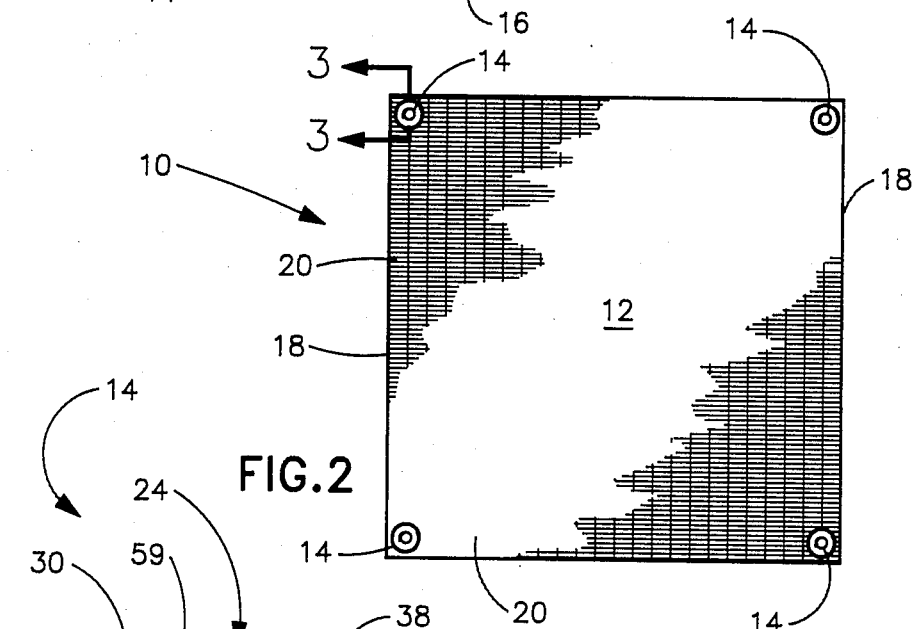
FIG. 2
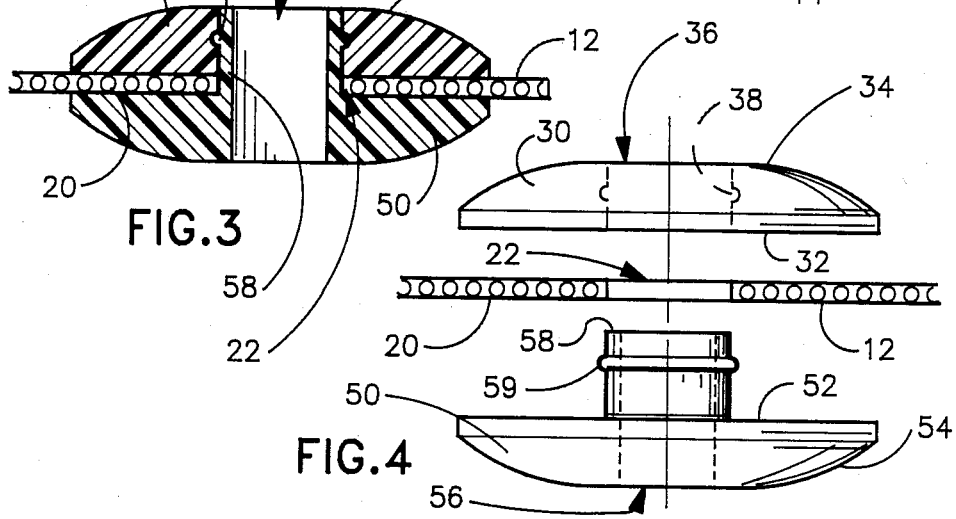
FIG. 3
FIG. 4

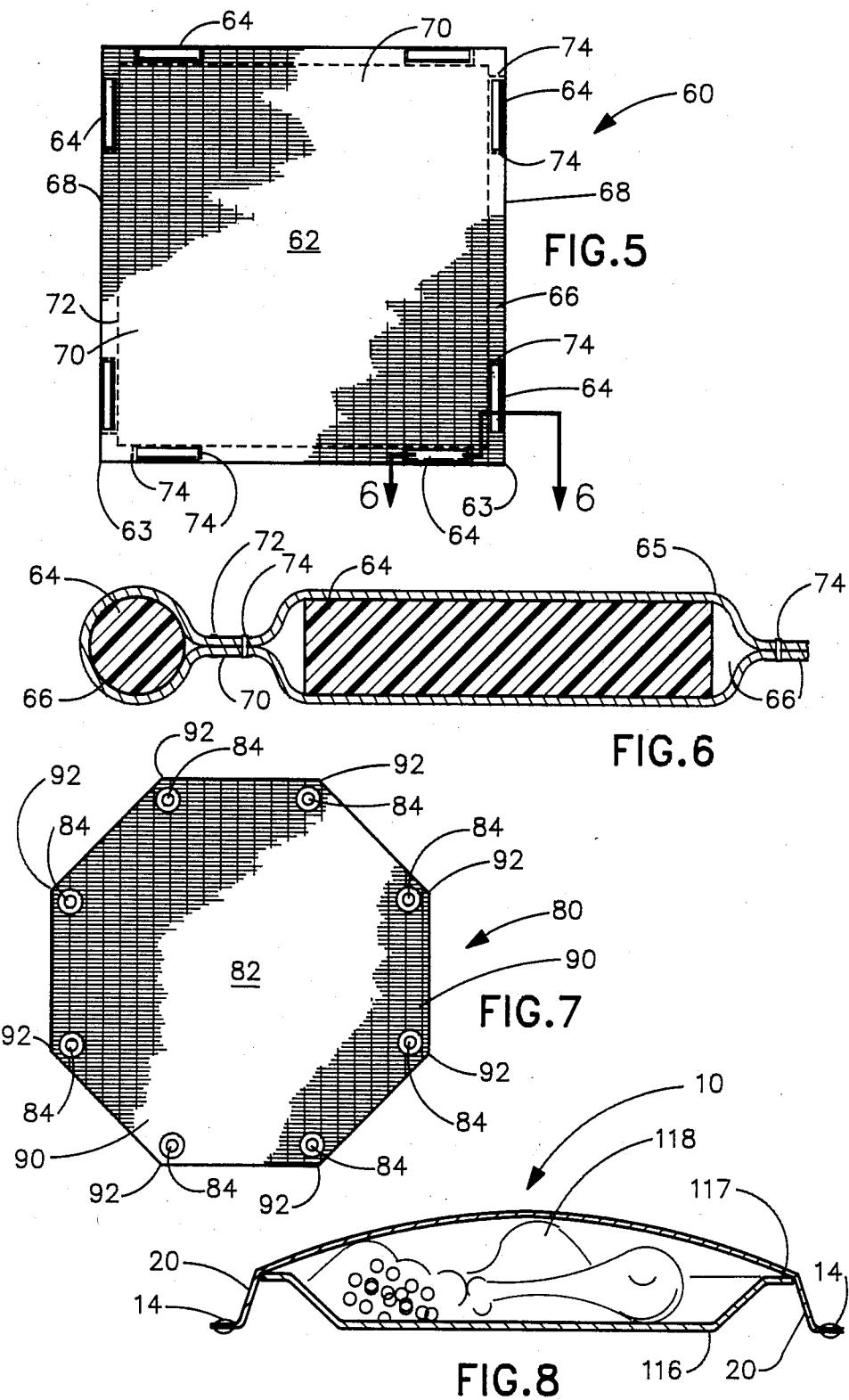

COVER DEVICE FOR PREVENTING SPATTERS DURING THE HEATING OF FOOD

BACKGROUND OF THE INVENTION

The present invention is directed to a cover device adapted to be placed over food during the heating of the food so as to prevent food spatters. Accordingly, the present invention is specifically adapted to be placed over food contained on a plate, bowl or other receptacle during heating in a microwave oven so as to prevent food spatters on the bottom and top surfaces as well as the side walls of the oven cavity. Thus, the present invention operates as a washable resulable cover during the cooking or heating of food.

Ever since humankind begin preparing food in cooking utensils, there have problems in cleaning the food particles both from those utensils and from the immediate surroundings. This problem especially arises where during the preparation of foods which tend to bubble and spatter during the cooking operation since the production and release of steam creates food bubbles which burst and propel small portions of the food onto cooking surfaces, surrounding walls and other objects adjacent the cooking utensil. As food preparation became more sophisticated, utensils were constructed which included, as one of their concomitant features, lids and other covers which, when placed on the utensil, help prevent food spattering during cooking or heating of the food.

In recent times, however, huge strides in the technology of food preparation has been achieved by the advent of the increasingly popular microwave oven. As is generally well known, these ovens broadcast electromagnetic radiation into their interiors. This electromagnetic radiation has wavelengths specifically tuned to interact with natural frequencies of water molecules which, upon receipt of the microwave energy, become electromagnetically pumped thereby producing heat. Since most foods contain a substantial portion of water, the heat generated by the excited water molecules cooks the food fairly uniformly with less tendency for burning or scorching.

A problem has arisen with microwave use, though, in that the excitation of water molecules within the interior of the food builds up pressure in the form of steam, which can erupt through the food and cause food spatters. Indeed microwaves tend to produce even greater numbers of bursting bubbles of steam than conventional heating produces. Further, since the interior cavity of the oven is confined, the walls of the microwave cavity as well as the top and bottom surfaces of the cavity can become fairly soiled with food particles, thus requiring frequent cleaning.

As noted above, the traditional way of preventing food spatters primarily comprising the placing of a lid over a typical pan or pot during cooking. In addition to this technique, the prior art has included rigid metallic screens of sufficient diameter to be placed so as to cover the rim of a pot, pan or skillet. These techniques are not readily adaptable for microwave use. First, the use of lids which substantially seal a container are often inappropriate for microwave use since steam pressure builds up in an extremely short interval of time so that a large release of steam might blow a lid off the container. Rigid spatter screens are of metallic construction and are not suitable for microwave use since it is well known that utensil fabricated of metal or containing metal parts are not suitable for use in microwave ovens due to the reflective property of metal. Even if a rigid screen is constructed of a non-metallic material, the rigid screen is not suitable for use in covering a plate of food that is heated, this procedure being a common use of microwave heating.

Accordingly, there is a need for an improved spatter device which is inexpensive yet which can readily act as a cover for containers in microwave ovens so that food spatters do not fly out of the container. There is a further need for such a spatter screen which can be used to cover food on an open plate in such a manner that food does not spatter therefrom. There is a further need for a spatter device which can be employed with a variety of different containers, yet which may be readily cleaned of any food particles that impinge thereon.

SUMMARY OF THE INVENTION

It is an object of the present invention to provide a novel and useful spatter device which can act as a screen to prevent food spatters during heating of the food, especially in microwave ovens.

It is another object of the present invention to provide a spatter device which is flexible in construction so that it may be used to cover a variety of different containers, including open plates, containing food.

It is yet another object of the present invention to provide a spatter screen which may come into direct contact with food for consumption which does not taint such food or otherwise render it unfit for human consumption.

A still further object of the present invention is to provide an inexpensive non-metallic, flexible spatter device which can be used to prevent food spattering during heating of foods, and which spatter device is readily cleanable in automated dishwashing machines.

According to the present invention, a screen device is provided in the form of a sheet of open weave flexible material having a high melting temperature and which is preferably formed of a non-toxic and non-metallic substance suitable for use in conjunction with the heating of foods. The sheet of open weave material is configured in a selected geometric shape so it has a surrounding peripheral edge and a peripheral margin adjacent that edge, with the sheet being sized for placement across the open top of a container in or on which food is to be heated. A plurality of weight elements are secured at spaced apart locations along the peripheral margin and has sufficient mass whereby the weight elements cause the peripheral margin of the sheet to drape downwardly alongside the container thereby maintaining a portion of the sheet in a fairly stretched condition across the container.

In the preferred form of the present invention, a square-shaped sheet of polyester material has four toroidal weights, one weight being located in the peripheral margin at each corner thereof. These weights are formed of a heavy plastic material and comprise two complimentary half sections that mate with one another through a hole in the material so that a passageway is formed through each weight. The weights may be attached to one another by a snap-fitting engagement or any suitable adhesive. Alternatively, the square-shaped sheet may have a peripheral hem sewn in which hem forms part of the peripheral margin of the screen device. A plurality of elongated cylindrical weights are then mounted in the hem, such as by sewing, with these elongated weights including a pair of weights at each corner with each weight of the corner pair being spaced a slight distance from the corner. This construction allows for weight to be placed around the marginal edge to further increase the tensioning ability when the screen is placed across a large open mouthed container. In another embodiment that is especially useful for circular containers, the screen has an octagonal construction and places a toroidal weight at each vertex of the octagon.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 1 is a perspective view of the screen device according to the preferred embodiment of the present invention in position across the top of a bowl;

FIG. 2 is a top plan view of the screen device shown in FIG. 1;

FIG. 3 is a cross sectional view taken about lines 3—3 of FIG. 2;

FIG. 4 is an exploded view in partial cross section of the toroidal weights shown in FIG. 3;

FIG. 5 is a top plan view of an alternate embodiment of the present invention utilizing different types and arrangements of weights;

FIG. 6 is a cross sectional view taken about line 6—6 of FIG. 6;

FIG. 7 is a top plan view of a third embodiment of the present invention; and

FIG. 8 is a cross sectional view of the present invention shown in the embodiments of FIGS. 2, 5 and 7 in use with a plate containing food.

DETAILED DESCRIPTION OF THE PREFERRED EMBODIMENT

The present invention is directed to a screen device adapted to be placed across a container of food, such as a bowl, plate and the like during heating of the food, especially in a microwave oven. Accordingly, while the present invention is described with respect to its use with a microwave oven, it should be appreciated that the structure and the function of the present invention can be used with other heating methods as well.

In its broad form, the present invention includes a sheet of material, preferably non-metallic, which includes weights mounted along its peripheral margin. The construction of the screen device is best shown in FIGS. 1-4, wherein it should be appreciated that screen device 10 is formed by fabric sheet 12 that is preferably an open weave polyester material. This open weave material is formed of a plurality of polyster threads such that the threads are in a 28×150 matrix (28 threads per inch×150 threads per inch). This material is very durable and does not unravel so that no edge sealing structure needs to be formed along edge 18 of sheet 12. Sheet 12 is preferably formed of as a square-shaped geometrical figure, although it should be appreciated that any geometrical configuration for sheet 12 is within the scope of this invention. Sheet 12 has a margin area 20 which is the peripheral area of sheet 12 immediately adjacent surrounding edge 18. Naturally, other materials known in the art could be used to fabricate sheet 12. In addition to polyester, sheet 12 may be constructed of nylon threads, rayon threads and Teflon threads; natural fibers may also be used. It should be appreciated that the ability of the fabrication material to withstand oven temperatures, the washability of the material, the material cost, and the cost of fabrication are criteria in selecting the material used for sheet 12. In any event, the material must also be acceptable for use with food products as regulated by various governmental agencies.

A plurality of toroidal weights 14 are then mounted in the peripheral margin at each corner of sheet 12. The structure and mounting of each weight 14 is best shown in FIGS. 3 and 4. Here it can be seen that each weight 14 is disc-shaped and formed of two complimentary half sections 30 and 50. Half section 30 is a toroidal shaped piece is circular and has a flat inner wall 32 and convex surface 34. A bore 36 is formed centrally through half section 30 and includes a circumferential groove 38 at a mid-portion thereof. Half section 50 is formed as a toroidal shaped member having a flat inner surface 52 and a concave surface 54. Upstanding hollow post 58 is formed on surface 52 with post 58 being axial of half section 50. Post 58 and half section 50 include a central bore 56 therethrough, and post 58 has a circumferencial rib 59 formed in spaced relation to flat surface 52. Bore 36 of section 30 is sized so it has an interior diameter equal to the exterior diameter of post 58, and rib 59 and groove 38 are sized and oriented with respect to one another so that, when post 58 is inserted into bore 36, rib 49 snap locks into groove 38.

Accordingly, it should be appreciated that with this construction each weight 14 is formed of a toroidal mass and is mounted such that one of sections 30 and 50 is on each side of sheet 12, as is shown in FIGS. 3 and 4. To allow mounting of weight 14 to sheet 12, a hole 22 is formed at each corner of sheet 12 and is sized to allow passage of post 58 therethrough. Accordingly, half section 50 is first mounted onto a corner of sheet 12 by inserting post 58 through hole 22 so that margin 20 of sheet 12 lies against flat surface 52 of half section 50. Half section 30 is then mounted onto the other side of sheet 12 with post 58 being received into bore 36 so that, when the half sections are compressed together, half sections 30 and 50 lock together by means of rib 59 and groove 38. Thus, weight 14 is secured to sheet 12 with margin 20 being firmly connected therebetween. The structure of each weight 14 provides a hole 24 extending completely therethrough screen device 10.

Naturally, it should be appreciated that other constructions of weights 14 are within the contemplation of this invention, and it should be understood that half sections 30 and 50 could be affixed to one another in any of numerous manners known in the art. Further, it is important that each of sections 30 and 50 be constructed of a non-metallic material that is suitable for microwave use and they need of sufficient density of allow the corners of sheet 12 to be biased by the force of gravity during use so that margin 20 drapes around the side wall of the container to be protected by screen device 10. A preferred material for the construction of weights 14 is Polyethelene Terephthalate. Other materials that are suitable for the construction of weights 14 include various other plastics such as polyester, nylon and rayon. Weights 14 can also be rubberized magnets; this allows convenient storage of the screen device 10 on any vertical steel surface, such as the outside of a microwave or conventional oven. It is important that weight 14 not reflect microwaves, however.

In use, then, screen device 10 is placed across the container, such as bowl 16 shown in FIG. 1 or plate 116 shown in FIG. 8. The screen device is either held in a fairly stretched condition across the upper opening of the container or is directly across the food product as is shown in FIG. 8. The user then heats the food, such as in a microwave oven, with screen device 10 being in place. Weights 14 keeps screen device 10 draped about the container during the heating operation so that the central portion of sheet 12 maintains contact with the rim of the container, such as bowl rim 17 shown in FIG. 1 and rim 117 of plate 116, shown in FIG. 8. Due to the open weave construction of sheet 12, any stream generated from food during the heating process may be vented through screen device 10 so the covering does not tend to become blown off the container. However, larger food particles which impinge the lower surface of the screen device as a result of bursting steam bubbles are not allowed to pass through sheet 12; rather, they are retained in the container or become stuck onto screen device 10. Due to the temperatures reached during heating, the materials used for sheet 12 and weights 14 are able to wthstand temperatures in excess of 100° C. without melting, are preferably able to withstand temperatures in excess of 120° C. without melting.

After heating the food, screen device 10 is removed and may be conveniently cleaned by placing screen device 10 in a conventional automated dishwasher. To this end, holes 24 are provided in each of weights 14 so that a weight 14 may be mounted over an upright prong in a conventional automated dishwater to maintain screen device 10 in a fixed position during the washing operation. Alternatively, screen device 10 can be placed in a net bag or the like, as is known in the art with respect to automated dishwashing machines.

An alternate embodiment of the present invention is shown in FIGS. 5 and 6 wherein screen device 60 is formed by a rectangular sheet of open weave material 62 which may be of a similar type to that described with respect to screen device 10 but may take other forms as well, such as cloth or other fabric material. Screen device 60 includes a margin area 70 which, as is shown in FIG. 6, is curved back on itself and is secured by stitching 72 to form a hem 66. A plurality of weights 64, in the form of elongated cylindrical plastic pieces, are secured within hem 66 at selected spaced locations along perimeter edge 68. As is seen in FIG. 5, weights 64 are preferably formed as pairs located adjacent each corner 63 of screen device 60 with each weight 64 being spaced apart from their respective corner 63. Weights 64 are secured against sliding movement within hem 66 by means of stitching 74 which extends transversely across hem 66 so as to form a pod-like enclosure 65 for each weight 64. This construction, then, allows increased weight to be used for screen device 60 and it should be appreciated that additional weights 64 could be placed within hem 66, if desired.

A third embodiment of the present invention is shown in FIG. 7 wherein a sheet 82 is used to construct a screen device 80. Sheet 82 is in the shape of an octagon, although again, it should be appreciated that the configuration of each screen device could take any selected geometrical configuration that is desired. Screen device 80 has a peripheral margin 90 and includes a plurality of weights 84 mounted within margin 90 at each vertex 92. Weights 84 are similar to and secured to sheet 82 in a manner similar to that described with respect to weights 34.

As is shown in FIG. 8, a screen device such as screen device 10, is particularly adaptable for use in preventing spatters from a plate of food during heating, such as is commonly performed for leftovers and the like in microwave ovens. Thus, plate 116 has a surrounding rim or lip 117 and holds an amount of food 118 which is desired to be heated. After placing food 118 on plate 116, the plate is placed in the microwave oven and screen device 10 is placed over plate 116 so that a central portion of sheet 12 actually contact food 118 with the margin area 20 extending across lip 117 to be draped downwardly along the side wall of the plate 116. Weights 14 then rest on the support surface, for example the floor of the microwave oven, and the heating operation is performed.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A screen device adapted to cover a container of food during cooking and heating in order to prevent food spatters, said container has a food support surface and an upstanding rim therearound, the screen device comprising:
   a sheet of flexible, open-weave material configured in a selected geometric shape having a surrounding peripheral edge and a margin adjacent said edge, said sheet sized to be placed across the container and overlap said rim; and
   a plurality of weight elements secured to said sheet at spaced-apart locations along said peripheral margin whereby said weight elements cause said margin area to hang downwardly alongside said container thereby maintaining a central portion of said sheet in an extended position across said container.

2. A screen device according to claim 1 wherein said material is non-metallic.

3. A screen device according to claim 2 wherein said material has a melting temperature greater than 120° C.

4. A screen device according to claim 2 wherein said material is polyester.

5. A screen device according to claim 1 wherein said weight elements are formed of Polyethelene Terephthalate.

6. A screen device according to claim 1 wherein said sheet is configured as a polygon, there being a weight element located at each vertex of the polygon.

7. A screen device according to claim 5 wherein said weight elements are each toroidal in shape and form of complimentary mating half sections, there being a first half section on one side of said sheet and a second half section on the other side of said sheet, said first and second half sections being secured together.

8. A screen device according to claim 6 wherein said sheet having holes formed in said margin at the location of each weight element, each said first half section including an upright axial post extending through a respective hole and having an axial passageway therethrough, each said second half section having an axial bore sized to matably receive the axial post of the complimentary first half section.

9. A screen device according to claim 7 wherein each post and each respective bore have a complimentary circumferential rib and groove structure to snap-lock the respective first and second half second together.

10. A screen device according to claim 1 wherein said margin includes a hem defining a peripheral chamber, said weight elements being elongated masses received at spaced locations in said peripheral chamber, and including retaining means for retaining each weight element at a respective location.

11. A screen device according to claim 10 wherein said sheet is configured as a polygon having a selected number of vertices for the sides thereof, there being a pair of said weights elements located in closely-spaced relation to each vertex along respective adjacent sides of said sheet.

12. A screen device according to claim 1 wherein at least one of said weight elements is formed of magnetic material.

* * * * *